United States Patent
Rhodes

(10) Patent No.: US 11,002,684 B2
(45) Date of Patent: May 11, 2021

(54) CHEMILUMINESCENT DETECTOR HAVING COATING TO REDUCE EXCITED SPECIES ADSORPTION

(71) Applicant: AGILENT TECHNOLOGIES, INC., Loveland, CO (US)

(72) Inventor: Robert P. Rhodes, Lincoln University, PA (US)

(73) Assignee: AGILENT TECHNOLOGIES, INC., Santa Clara, CA (US)

(*) Notice: Subject to any disclaimer, the term of this patent is extended or adjusted under 35 U.S.C. 154(b) by 0 days.

(21) Appl. No.: 13/718,061

(22) Filed: Dec. 18, 2012

(65) Prior Publication Data

US 2014/0119993 A1    May 1, 2014

Related U.S. Application Data

(63) Continuation-in-part of application No. 13/660,273, filed on Oct. 25, 2012, now Pat. No. 9,448,177.

(51) Int. Cl.
*G01N 21/76* (2006.01)

(52) U.S. Cl.
CPC .................. *G01N 21/766* (2013.01)

(58) Field of Classification Search
CPC .... G01N 31/12; G01N 21/76; G01N 33/0014; G01N 33/0042; G01N 33/203; G01N 33/287; G01N 21/766
USPC ............................ 422/54, 68.1, 82.05, 89, 88
See application file for complete search history.

(56) References Cited

U.S. PATENT DOCUMENTS

| | | | |
|---|---|---|---|
| 3,879,126 A | 4/1975 | Delew | |
| 4,018,562 A | 4/1977 | Parks et al. | |
| 4,269,804 A | 5/1981 | Kring | |
| 4,352,779 A | 10/1982 | Parks | |
| 5,227,135 A | 7/1993 | Godec et al. | |
| 5,614,417 A * | 3/1997 | Kubala | G01N 21/76 422/52 |
| 5,728,586 A | 3/1998 | Platzer | |
| 5,739,038 A | 4/1998 | Burrows | |
| 5,786,887 A | 7/1998 | Ebata et al. | |
| 6,093,371 A * | 7/2000 | Wilson | 422/89 |
| 6,143,245 A | 11/2000 | Yan et al. | |
| 6,205,841 B1 | 3/2001 | Shibamoto | |
| 6,444,326 B1 | 9/2002 | Smith | |
| 6,580,067 B1 | 6/2003 | Yamada et al. | |

(Continued)

FOREIGN PATENT DOCUMENTS

| | | |
|---|---|---|
| CN | 1804595 B | 9/2010 |
| CN | 103163256 A | 6/2013 |
| WO | WO2002066966 | 8/2002 |

OTHER PUBLICATIONS

Office Action dated Mar. 19, 2014 for Chinese Patent Application No. 201320597882.5.

(Continued)

*Primary Examiner* — Samuel P Siefke

(57) ABSTRACT

An apparatus for receiving a chemical species is disclosed. The apparatus includes an emission block configured to receive a vapor phase chemical species that is excited by chemical reaction in the emission block to provide an excited species that emits light. The emission block has an interior portion having a surface. A coating is disposed over the surface and the coating reduces adsorption of the excited species onto the surface.

19 Claims, 4 Drawing Sheets

(56) References Cited

U.S. PATENT DOCUMENTS

| | | |
|---|---|---|
| 6,723,286 B2 | 4/2004 | Sakairi et al. |
| 7,744,818 B2 * | 6/2010 | Iwamoto et al. ............... 422/88 |
| 7,906,071 B2 | 3/2011 | Warchol et al. |

OTHER PUBLICATIONS

Non-Final Office Action dated Dec. 22, 2014 in U.S. Appl. No. 13/660,273.
Final Office Action for co-pending U.S. Appl. No. 13/660,273, filed Oct. 25, 2012.
Applicant-Initiated Interview Summary for co-pending U.S. Appl. No. 13/660,273 dated Oct. 26, 2015.
"FPD-GC14C", GC-14C, 16 pages referenced in Chinese Office Action dated Nov. 28, 2016.
Notice of Allowance for related U.S. Appl. No. 13/660,273 dated May 20, 2016.

\* cited by examiner

CHEMILUMINESCENT DETECTOR HAVING COATING TO REDUCE EXCITED SPECIES ADSORPTION

CROSS-REFERENCE TO RELATED APPLICATIONS

The present application is a continuation-in-part of and claims priority under 35 U.S.C. § 120 from U.S. patent application Ser. No. 13/660,273 entitled "Flame Photometric Detector," naming Robert P. Rhodes inventor, and filed on Oct. 25, 2012. The disclosure of this application (referred to below as the "parent application") is specifically incorporated herein by reference.

BACKGROUND

Gas chromatography (GC) is used to analyze and detect the presence of many different substances in a gaseous or vaporized sample. Gas chromatography uses various types of detectors, depending on the specific element or compound sought to be detected. Different detectors are used to achieve selective and/or highly sensitive detection of specific elements or compounds in particular chromatographic analyses.

Typically, a chemiluminescent detector (CD) is used to detect the presence of certain elements including, for example, sulfur (SCD), or phosphorus, or nitrogen (NCD) in a particular sample, or analyte molecule. In certain chemiluminescent detectors a reaction occurs in an ozone-rich environment and results in an excited species. Examples are the sulfur chemiluminescent detector (SCD) where the reaction with ozone yields $SO_2^*$, or the nitrogen chemiluminescent detector where the reaction with ozone yields $NO_2^*$. In other chemiluminescence detectors such as the flame photometric detector (FPD), an analyte is burned in a flame in a hydrogen ($H_2$) rich environment to form an excited species (e.g., $S_2^*$, or $HPO^*$). During relaxation of the excited species to a lower energy state, light (hv) is emitted in an emission block of the detector. Chemiluminescence uses quantitative measurements of the optical emission from excited chemical species to determine analyte concentration. The photons emitted are incident on a photomultiplier tube, which converts photons to an electrical signal that can be used to quantify the concentration of a particular excited species.

Often the emission block of the detector is made of a suitable material for its particular application, such as a metal or metal alloy (e.g., stainless steel). Unfortunately, the excited species can be adsorbed on the surface of the emission block of the detector, and thereby are lost for light emission. The light intensity due to the relaxation of the excited species is commensurately reduced, and the detection limit of the detector is detrimentally impacted.

What is needed, therefore, is an apparatus that overcomes at least the shortcomings of known structures described above.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DEFINED TERMINOLOGY

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' mean to with acceptable limits or degree. For example, 'substantially cancelled' means that one skilled in the art would consider the cancellation to be acceptable.

As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

DETAILED DESCRIPTION

In the following detailed description, for purposes of explanation and not limitation, representative embodiments disclosing specific details are set forth in order to provide a thorough understanding of the present teachings. Descriptions of known systems, devices, materials, methods of operation and methods of manufacture may be omitted so as to avoid obscuring the description of the example embodiments. Nonetheless, systems, devices, materials and methods that are within the purview of one of ordinary skill in the art may be used in accordance with the representative embodiments.

Representative embodiments are directed to an apparatus comprising a chemiluminescence detector that comprises an emission block. The emission block configured to receive a vapor phase chemical species that is excited by chemical reaction in the emission block to provide an excited species that emits light for detection by a detector in optical communication with the emission block. The emission block has an inner surface, which is coated with a material that reduces adsorption of the excited species in the emission block. Because more excited species remain in the fluid phase (e.g., vapor phase) in the emission block, the light intensity due to the relaxation of the excited species is comparatively increased and the detection limit of the detector is commensurately improved compared to known detectors.

Figure 1:
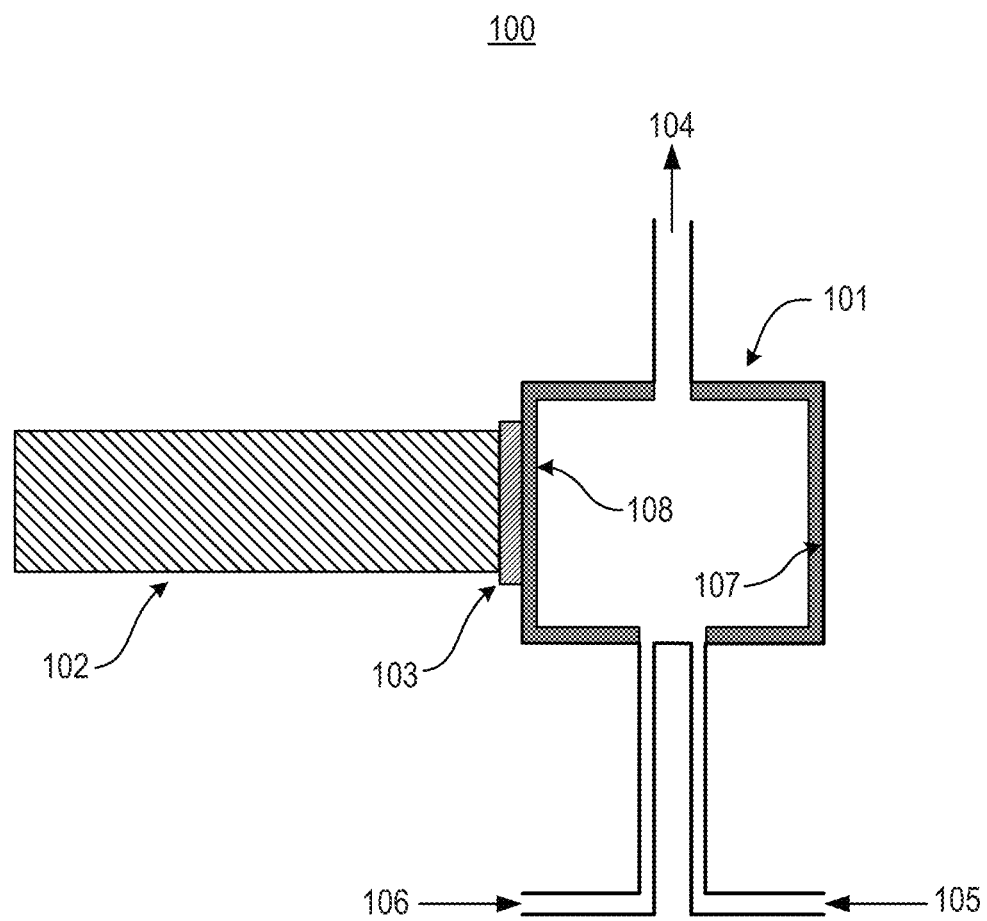
FIG. 1 is a simplified block diagram of a reaction/emission/detection zone of a CD in accordance with a representative embodiment.

FIG. 1 shows a perspective view of a CD 100 in accordance with a representative embodiment. The CD 100 comprises an emission block 101, a photodetector 102 and an optical element 103 (e.g., a passive optical element)

disposed between the emission block 101 and the photodetector 102. In the presently described embodiments certain aspects of the CD 100 that are not germane to the description of the representative embodiments, are not provided to avoid obscuring the description of the representative embodiments. For example, supporting electronic components (e.g., a processor) and flow control components are not described, but are of course contemplated for use in connection with the presently described embodiments.

The CD also comprises a vent 104, such as described in the parent application. The optical element 103 may be a wavelength selective optical filter, and may comprise an optical grating, or a prism, or a birefringent optical element. Illustratively, the optical element 103 may be as described in commonly owned U.S. Pat. No. 7,906,071 to Warchol, et al. The disclosure of U.S. Pat. No. 7,906,071 patent is specifically incorporated herein by reference.

The excited species is formed in the emission block 101, and light is selectively provided to the photodetector 102. Depending on the application or preference of one of ordinary skill in the art, the photodetector 102 may be a photomultiplier tube (PMT), or a spectrometer comprising a photodiode, or a photodiode array, or other device suitable for detecting the emitted light within the purview of one of ordinary skill in the art. In operation, light emitted by the excited species in the emission block 101 is provided in a wavelength selected manner to the photodetector 102 to provide data relating to the content and quantity of the excited species as is known by one of ordinary skill in the art.

As described more fully below, the CD 100 may comprise two reaction zones, or one reaction zone. In the former, one or more chemical reactions occur in a first reaction zone, and another chemical reaction occurs in the second reaction zone, where the chemical reaction in the second reaction zone produces the excited species. In such a configuration, the second reaction zone is the emission block 101. In the latter, the emission block 101 is the only reaction zone, in which the chemical reaction to produce the excited species occurs. As described more fully below, SCD's and NCD's typically comprise two or more reaction zones, with the final reaction zone being the emission block 101; whereas an FPD typically comprises only one reaction zone (i.e., emission block 101).

A reactant stream 105 is provided to the emission block 101, and includes necessary gases to effect the chemiluminescent reaction in the emission block 101. An analyte stream 106 is also provided to the emission block. The materials provided in the analyte stream 106 depend upon whether the CD 100 is a two reaction zone device or a one reaction zone. If the CD 100 is a two reaction zone device, the analyte stream 106 will comprise analytes received from the first reaction zone, whereas if the CD 100 is a single reaction zone device, the analyte stream comprises effluent from the column of the GC. Additional details of the analytes and reactant gases of the analyte stream 106 and the reactant stream 105 are described below in connection with certain representative embodiments that illustrate various aspects of the present teachings.

The emission block 101 comprises an inner surface 107. The inner surface 107 of the emission block 101 may be made of the same material as the emission block 101 (e.g., stainless steel), or may comprise another material. For example, the inner surface 107 could be silica that is further coated or modified per the teachings below. Alternatively, the inner surface 107 may comprise nickel or gold that is coated or modified per the teachings below. A coating 108 is provided over the inner surface 107 of the emission block 101. The coating 108 is selected to reduce, if not eliminate, the adsorption of the excited species present in the emission block 101. The reduction of adsorption of the excited species at the inner surface 107 of the emission block 101 results in a greater amount of excited species undergoing relaxation via chemiluminescence with resultant detection by the photodetector 102. Beneficially, this results in an increase in the light intensity to the photodetector 102 due to the relaxation of the excited species, and an increase in the detection limit of the detector is commensurately improved compared to known detectors.

The specific material selected for the coating 108 is based upon the chemistry of the excited species, so the material is selected to reduce adsorption of the excited species into the inner surface 107 of the emission block. In a representative embodiment, the coating 108 comprises a functionalized hydrogenated amorphous silicon surface, such as described, for example in U.S. Pat. No. 6,444,326, to Smith. The disclosure of U.S. Pat. No. 6,444,326 is specifically incorporated herein by reference.

In other embodiments, the coating 108 comprises a layer of silica ($SiO_2$) or a layer of silicon carbide (SiC). The coating may further comprise a cap layer of an organic material disposed over the layer of silica. For example, the coating 108 may comprise silica having organic caps on the hydroxyl groups on the surface of the coating 108. For purposes of illustration, the coating 108 may have a thickness in the range of approximately 400 Å to approximately 2500 Å. In certain embodiments, the coating 108 comprises a layer of silica having a thickness of approximately 1200 Å to approximately 2500 Å, and the layer of organic material is approximately 400 Å to approximately 1000 Å.

More generally, the coating 108 may comprise one or more layers of silicon chemically modified to reduce the adsorption of the excited species on the surface of the emission block 101. Illustratively, one or more layers of silicon is formed over the surface of the emission block 101, and chemically modified to provide the desired coating. The formation of the layer(s) of silicon is effected using techniques well known to one of ordinary skill in the art. Chemical modification may include oxidation to provide a suitable oxide of silicon (e.g., silica). Alternatively the coating 108 may comprise a silicon nitride ($Si_3N_4$) or titanium nitride (TiN). These layers of oxides or nitrides of silicon or titanium may be further modified with an organic material to realize a desired barrier to reduce or prevent adsorption of the excited species on the inner surface 107 of the emission block. Notably, chemical modification of silicon, titanium and other suitable substrate materials for the coating 108 may be as effected using known processing techniques and materials known, for example, to one of ordinary skill in the semiconductor processing arts and are generally not repeated.

In other representative embodiments, the coating 108 may be a hydrophobic material. For example, the coating 108 may be an organic polymer such as polytetrafluoroethylene (PTFE) or other fluoropolymer.

The representative embodiments described above are presented in connection with a "generic" CD 100. The CD 100 may be an SCD, an NCD, or an FPD, with the coating selected to reduce or eliminate the adsorption of a particular excited species in the particular chemical and physical environment of the emission block. Embodiments described presently detail certain specific chemiluminescence detectors contemplated for use in connection with the present teachings. It is emphasized that the descriptions of the detectors according to representative embodiments described below are not in any way limiting of the present teachings. Rather, the present teachings may be implemented in a variety of chemiluminescence detectors and components thereof to reduce adsorption of the excited species in such components in order to increase in the light intensity from the excited species to a photodetector due to the relaxation of the excited species, and to improve the detection limit of the CD compared to known detectors.

Figure 2:
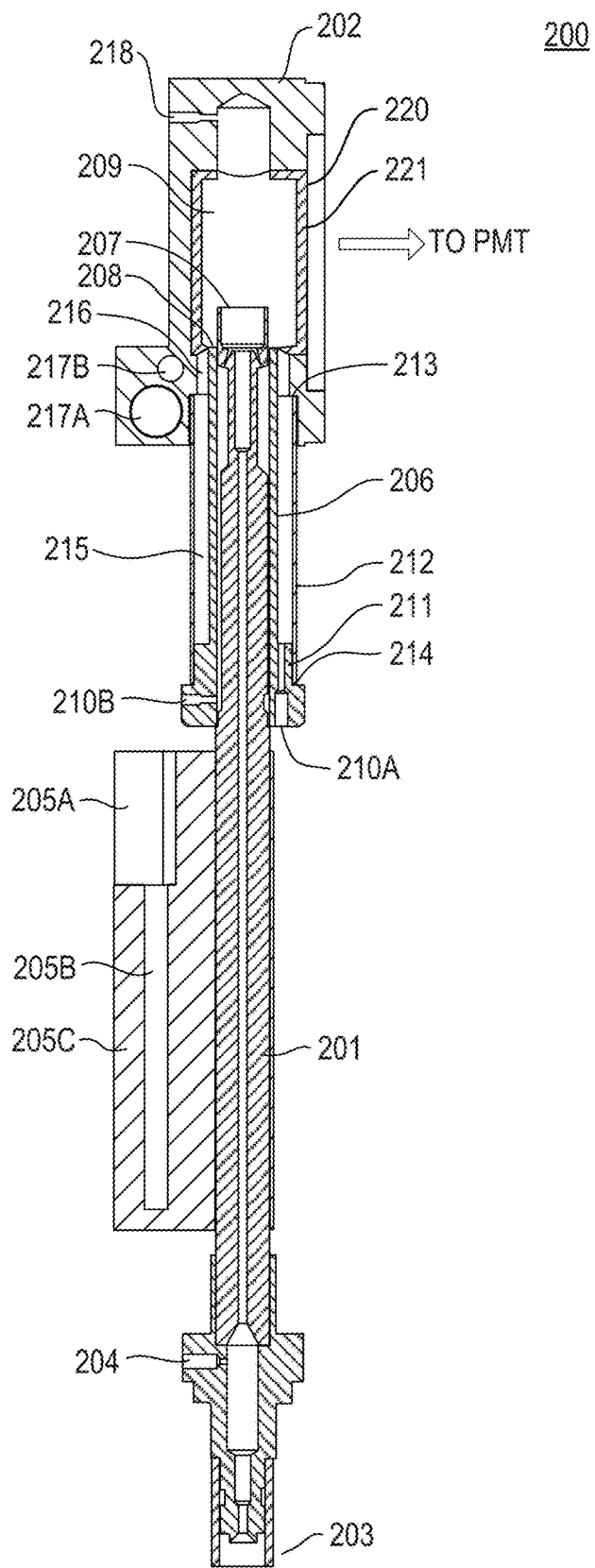
FIG. 2 is a cross-sectional view of an FPD in accordance with a representative embodiment.

FIG. 2 is a cross-sectional view of a transfer line 201 connected between a column of a GC apparatus (not shown) and an emission block 202 of an FPD 200 in accordance with a representative embodiment. Many details of the FPD 200 are common to the CD 100 described above, and are not repeated to avoid obscuring the presently described embodiment.

The FPD 200 comprises a column fitting 203 that connects the transfer line 201 to the column of the GC apparatus. As noted above, the column fitting 203 is disposed in the GC oven (not shown) of the GC apparatus (not shown). A first gas fitting 204 is included for providing hydrogen gas and so-called make-up gas (e.g., $N_2$) for use in the FPD 200.

A temperature sensor 205A and a transfer line heater 205B are provided on a transfer line block 205C, which is illustratively aluminum or another suitable thermal conductor. The transfer line block 205C is disposed around at least a portion of the transfer line 201 for maintaining the temperature of the transfer line 201 (and the effluent therein) to within a desired temperature range. As noted above, the transfer line heater 205B is generally a known cartridge heater such as a resistive heater (e.g., a known wire heater having current passing therethrough). The temperature sensor 205A is a known temperature sensor that periodically measures the temperature of the transfer line block 205C.

As noted above, the transfer line 201 is maintained at a temperature substantially equal or even greater than the column temperature and the oven temperature of the GC apparatus to substantially prevent the condensation of the sample before it reaches the flame of the jet within the emission block 202. Illustratively, the transfer line heater 205 maintains the temperature of the transfer line 201 in a range of approximately 200° C. to approximately 400° C.

The FPD 200 also comprises a jet housing 206 with a jet 207 provided at one end (the "top end") 208 thereof and inside a cavity 209 of the emission block 202. The FPD 200 comprises a gas inlet 210A and a gas inlet 210B at a second end (the "bottom end") 211 of the jet housing 206. Purge gas is introduced through gas inlet 210A and air is introduced through gas inlet 210B. The burning of the effluent from the transfer line 201 is effected by the jet 207 in the cavity 209, and spectra therefrom are provided to the photodetector (e.g., PMT—not shown in FIG. 2).

A body tube 212 is disposed around the portion of the transfer line 201 that is disposed in the jet housing 206. The body tube 212 is connected at a first end 213 to the emission block 202 and at a second end 214 at the second end 211 of the jet housing 206. Illustratively, the first end 213 of the body tube 212 is brazed to the emission block 202 and the second end 214 of the body tube 212 is brazed at the second end 211 by a known technique. The brazing of the body tube 212 at the first end 213 to the emission block 202 and at the second end 214 to the second end 211 of the jet housing 206 provides a good thermal contact at both ends of the body tube 212. As described more fully below, this good thermal contact is useful in maintaining the emission block 202 at the second temperature range and the transfer line 201 at the first temperature range, which is greater than the second temperature range.

The body tube 212 is illustratively a hollow cylinder made of a suitable metal/metal alloy. For example, the body tube 212 may be stainless steel suitable for brazing. Moreover, the walls of the body tube 212 are comparatively thin to foster (thermal) power dissipation and a comparatively large temperature change between the first end 213 and the second end 214 of the body tube 212. Illustratively, the walls of the body tube 212 have a thickness of approximately 0.381 mm to approximately 0.508 mm. As described more fully below, this allows the transfer line 201 to be maintained in a first temperature range and the emission block to be maintained in the second temperature range that is lower than the first temperature range. Beneficially, the effluent is maintained to within a desired temperature range from the column through the transfer line 201 and to the jet 207; and the emission block 202 is maintained at a suitable temperature to prevent failure of seals, or damage to the PMT, or both.

A first gap 215 is provided between the body tube 212 and the jet housing 206. Moreover, a second gap 216 is provided between the jet housing 206 and the emission block 202. The first gap 215 provides suitable thermal isolation between the transfer line 201 in the jet housing 206 and the body tube 212, and the second gap 216 provides suitable thermal isolation between the transfer line 201 and the emission block 202. As a result, the transfer line 201 has a comparatively low thermal impedance, and the loss of thermal power along this length of the transfer line 201 is comparatively small. Accordingly, the temperature drop along the length of the transfer line 201 between the bottom end 211 of the jet housing 206 and the top end 208 of the jet housing 206 is comparatively small. As such, the temperature of the transfer line 201 disposed in the jet housing 206 is maintained to a desired temperature range through conduction from transfer line heater 205 and heat from the flame of the jet 207. Beneficially, the temperature of the transfer line 201 and the effluent therein can be maintained to within a desired temperature range between the column fitting 203 and the jet 207.

As depicted in FIG. 2, an emission block heater 217A and a temperature sensor 217B are provided adjacent to the emission block 202. As noted above, the emission block heater 217A is generally a known cartridge heater such as a resistive heater such as a known wire heated by passing current therethrough, in order to meet power requirements to heat the emission block 202. The emission block heater 217A is disposed at a selected position of the emission block 202 to maintain the temperature as desired. The temperature sensor 217B is a known temperature sensor that periodically measures the temperature of the emission block 202.

As noted above, in the S-mode operation the response of the FPD 200 is a function of the temperature of the emission block 301. As such, the emission block heater 217A is useful in maintaining the temperature in a desired temperature range. However, in the P-mode operation, it is possible that power received through the body tube 212 could suffice for heating the emission block 202. Notably, in such an embodiment, insulation around the emission block 202 would be useful. As such, in some embodiments, the emission block heater 217A and the temperature sensor 217B could be foregone.

The heat transfer through a thin metal tube (e.g., body tube 212) is axial along the length of the tube with little power dissipated radially inwardly or outwardly. As such, the body tube 212 has a comparatively high thermal impedance. This allows for a significant change in temperature along the length of the body tube 212 between the first end 213 and the second end 214 of the body tube 212. Moreover, and as noted above, the body tube 212 is brazed to the emission block 202 at its first end 213, and is brazed to the jet housing 206 at its second end 214 (at the bottom end 211 of the jet housing 206). Beneficially, because of the brazing of the body tube 212 to the emission block 202 and to the jet housing at the bottom end 211, and because of the temperature difference between the first and second ends 213, 214 of the body tube, the emission block 202 can be maintained in a first temperature range, and the transfer line 201 in the jet housing 206 is maintained in a second temperature range that is greater than the first temperature range.

In a representative embodiment, a purging gas (e.g., $N_2$) is provided through the second gap 216. In addition to providing thermal isolation between the transfer line 201 in the jet housing 206 and the body tube 212, this purging gas beneficially removes and prevents effluent from the seeping into the first gap 215, and is emitted along with other gases through a vent 218. As should be appreciated by one of ordinary skill in the art, without the purging gas in the first gap 215, a dead volume can exist. Ultimately, effluent in the dead volume can be excited by the flame of the jet 207 resulting in undesirable "tails" in the emission spectral response of the GC apparatus that comprises the FPD. By the present teachings these "tails" can be substantially avoided.

The emission block 202 comprises an inner surface 220. A coating 221 is provided over the inner surface 220 of the emission block 202. The coating 221 is selected to reduce, if not eliminate, the adsorption of the excited species present in the emission block 202. The reduction of adsorption of the excited species at the inner surface 220 of the emission block 202 results in a greater amount of excited species undergoing relaxation and therefore radiative emission to the PMT (not shown). Beneficially, this results in an increase in the light intensity to the PMT due to the relaxation of the excited species, and an increase in the detection limit of the detector is commensurately improved compared to known detectors.

The coating 221 may be one of the coatings described above in connection with the representative embodiments of FIG. 1. As noted above, the coating 221 is selected to reduce the adsorption of the particular excited species provided to the emission block 202 and into the inner surface 220. As noted above and in the parent application, FPDs are used for the detection of sulfur and phosphorus. Specifically, detection of sulfur through detection of photoemission during the relaxation of the excited species $S_2^*$ is used in the measure of sulfur compounds present in an analyte sample; and detection of phosphorus through detection of photoemission during the relaxation of the excited species HPO* is used in the measure of phosphorous compounds present in an analyte sample. In an illustrative example, methyl mercaptan ($CH_3SH$) burns in the flame from the jet 207 to form $CO_2$, $H_2O$, $SO_x$, and $S_2^*$, where the relaxation of the excited species of $S_2^*$ to a lower energy state results in photoemission (hv) that is detected by the PMT. Illustratively, the coating 221 comprises functionalized hydrogenated amorphous silicon, or more generally functionalized silicon. Notably, in the detection of sulfur using FPD 200 of a representative embodiment, the intensity of emissions of the excited species is approximately three-times to approximately four-times that of a known FPD. As the response is a square-law response, an improvement in the detection limit realized by FPD 200 of a representative embodiment, is approximately 1.7-times to two-times that realized by a known FPD.

FPD 200 is directed to a representative embodiment with specific aspects described above. It is noted that this embodiment is merely illustrative, and other "single reaction zone" CDs are contemplated for use in connection with the present teachings. An illustrative embodiment is depicted in and described in connection with FIG. 3.

Figure 3:
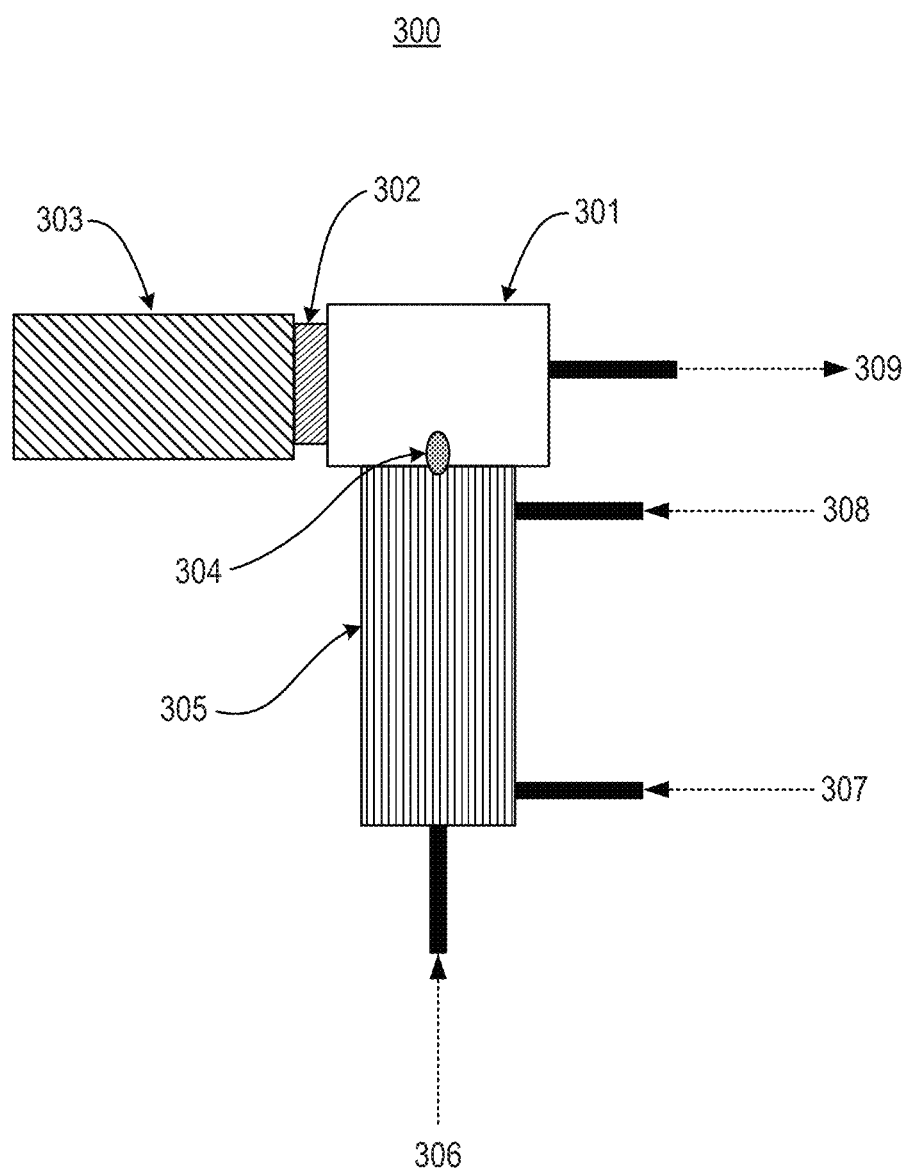
FIG. 3 is a cross-sectional view of an FPD in accordance with a representative embodiment.

FIG. 3 is a simplified block diagram of a CD 300 in accordance with a representative embodiment. Notably, many aspects and details of the CD 300 are common to those of the CD 100 and the FPD 200 described above. Details of such common aspects and details are often not repeated to avoid obscuring the description of the presently described representative embodiments.

In the presently described embodiments certain aspects of the CD 300 that are not germane to the description of the representative embodiments, are not provided to avoid obscuring the description of the representative embodiments. For example, supporting electronic components (e.g., a processor) and flow control components are not described, but are of course contemplated for use in connection with the presently described embodiments.

The CD 300 comprises an emission block 301, a photodetector 303 and an optical element 302 disposed between the emission block and photodetector 303. A reaction zone 304 is provided in the emission block 301. Illustratively, the reaction zone 304 comprises a burner (e.g., a flame burner) useful in effecting a desired chemical reaction to produce an excited species (not shown) in the emission block 301. The reaction zone 304 associated with the emission block 301 may comprise the entire emission block 301, or it may be limited in area, as in the case of a flame burner used in an FPD. Multiple reactions may occur in any reaction zone.

The CD 300 also comprises a transfer zone 305 disposed between the reaction zone 304 and a sample inlet 306. The transfer zone 305 may include a transfer line (not shown in FIG. 3) such as described in the parent application. The transfer zone 305 also receives reactants from a first reaction stream 307 and from a second reaction stream 308 in the presently described embodiment. The reactants received from the first and second reaction streams 307, 308 are useful in the reaction zone 304 to effect the desired chemical reaction in the emission block 301. It is noted that the number of reactant streams may be different than what is disclosed in FIG. 3 (i.e., one or more than two for particular reaction zone).

As should be appreciated by one of ordinary skill in the art, the CD 300 may be a detector on a GC device where components of the sample undergo some degree of separation prior to reaching the reaction zone 304. Alternatively, CD 300 may be useful for some samples, wherein the entire sample is vaporized and loaded into the transfer zone 305 for transfer to the reaction zone 304. The emission block 301 is not limited to the detection and measurement of a particular excited species (e.g., $S_2^*$ or HPO*), and it is beneficial to provide a coating (not shown in FIG. 3) on an inside surface (not shown) of the emission block 301 based upon the excited species being detected/measured. The coating is selected to reduce or eliminate adsorption of the excited species in the emission block. The coatings useful for reduction/elimination of adsorption of the excited species in the emission block are described more fully above.

The CDs described above in connection with FIGS. 2 and 3 are "single reaction zone" CDs. It is noted that this is merely illustrative, and that CDs having multiple reaction zones are contemplated for use in connection with the present teachings. An illustrative embodiment is depicted in and described in connection with FIG. 4. Notably, common to all chemiluminescence detectors of the present teaching is an emission block that comprises a reaction zone, and the inner surface of the emission block comprises a coating formed thereover to reduce or eliminate adsorption of the excited species present in the emission block.

Figure 4:
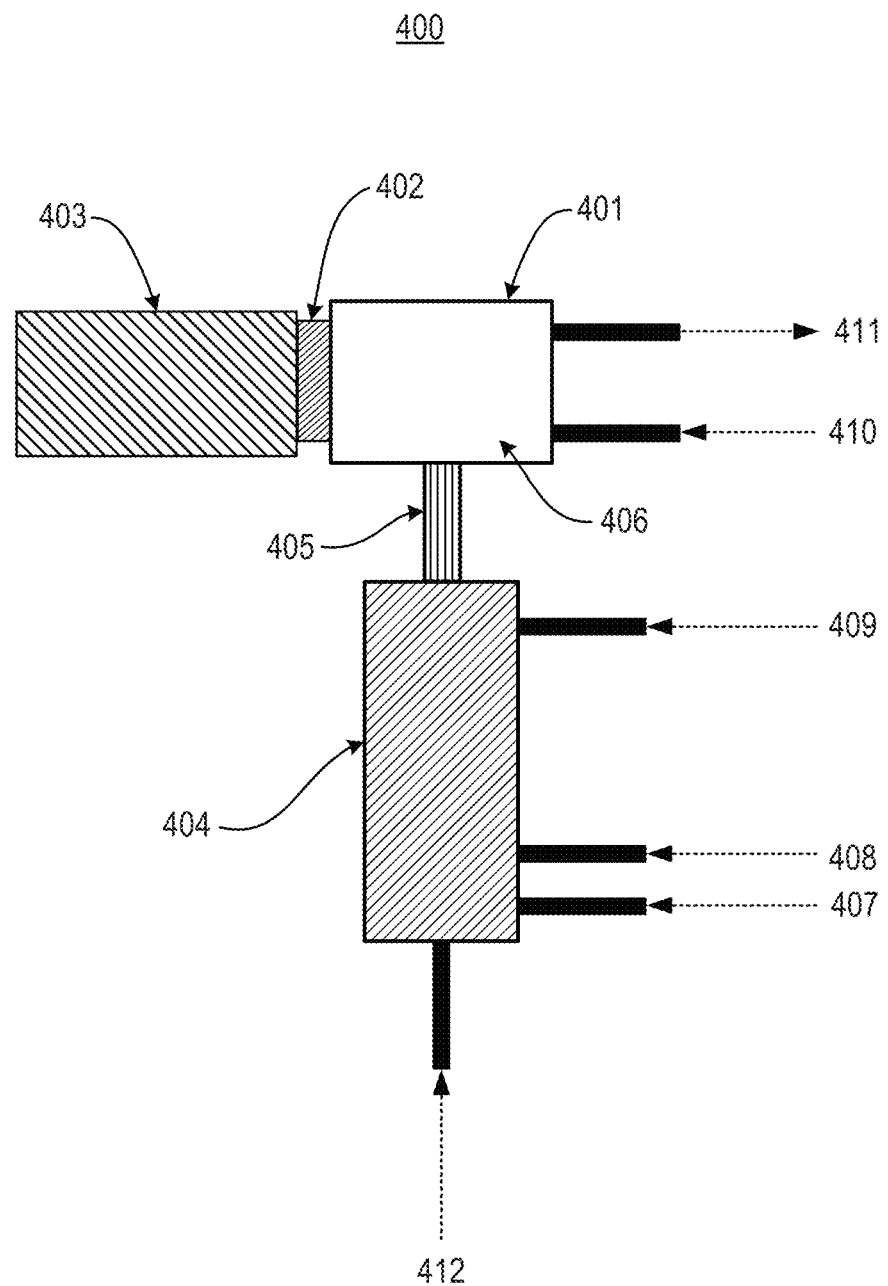
FIG. 4 is a cross-sectional view of a CD in accordance with a representative embodiment.

FIG. 4 is a simplified block diagram of a CD 400 in accordance with a representative embodiment. Notably, many aspects and details of the CD 400 are common to those of the CD 100, the FPD 200 and the CD 300 described above. Details of such common aspects and details are often not repeated to avoid obscuring the description of the presently described representative embodiments. In the presently described embodiments, certain aspects of the CD 400 that are not germane to the description of the representative embodiments, are not provided to avoid obscuring the description of the representative embodiments. For example, supporting electronic components (e.g., a processor) and flow control components are not described, but are of course contemplated for use in connection with the presently described embodiments.

The CD 400 comprises an emission block 401, a photodetector 403 and an optical element 402 disposed between the emission block and photodetector 403. A first reaction zone 404 is connected to a transfer zone 405, which in turn is connected to the emission block 401. A second reaction zone 406 is provided in the emission block 401. The second reaction zone 406 may comprise the entire emission block 401, or it may be limited in area within the emission block.

First reaction zone 404 receives reactants from a first reactant stream 407, a second reactant stream 408 and a third reactant stream 409. As described below in connection with illustrative examples, the reactants provided from the first, second and third reactant streams 407~409 are used to chemically react analyte molecules to form an intermediate reaction product. For example, the first reaction zone 404 may comprise a first burner (not shown) useful in the chemical reaction to form the intermediate reaction product.

The intermediate reaction product is then provided to the transfer zone 405. Fourth reactant streams 410 provide reactants useful in reacting the intermediate reaction product received from the first reaction zone 404 to form the excited species in the emission block 401. Illustratively, the second reaction zone 406 comprises a burner (not shown) that is useful in effecting a desired chemical reaction to produce an excited species (not shown) in the emission block 401. Notably, for example, the second reaction zone 406 may rely upon an oxidation reaction with ozone ($O_3$). The second reaction zone 406 associated with the emission block 401 may comprise the entire emission block 401, or it may be limited in area, as in the case of a flame burner used in an FPD.

In operation, a sample stream 412 is provided to the first reaction zone 404 where the intermediate reaction products are formed. Illustratively, the sample stream 412 may be the effluent from a GC column such that few components enter the first reaction zone 404 at any one time, or the effluent could be an unseparated sample that is vaporized before entering the first reaction zone 404. This configuration is useful if the detector response to the analytes of interest is not compromised by the presence of other sample components. Notably, the output of the CD 400 is a total value of the element present in the sample stream rather than the values of individual components.

These intermediate reaction products are provided to the second reaction zone 406 where the excited species are formed for chemiluminescent detection and measurement. As should be appreciated by one of ordinary skill in the art, the CD 400 may be a detector on a GC device where components of the sample undergo some degree of separation prior to reaching the second reaction zone 406. Alternatively, CD 400 may be useful for some samples, wherein the entire sample is vaporized and loaded into the first reaction zone 404. The emission block 401 is not limited to the detection and measurement of a particular excited species (e.g., $S_2^*$ or HPO*), and it is beneficial to provide a coating (not shown in FIG. 4) on an inside surface (not shown) of the emission block 401 based upon the excited species being detected/measured. The coating is selected to reduce or eliminate adsorption of the excited species in the emission block. The coatings useful for reduction/elimination of adsorption of the excited species in the emission block are described more fully above.

In order to improve the measurement and detection of the excited species (e.g., $S_2^*$, $SO_2^*$, $NO_2^*$, HPO*), it is beneficial to provide a coating (not shown in FIG. 4) on an inside surface (not shown) of the emission block 401. Notably, the coating is provided over all portions of the second reaction zone 406 and the interior surface of the emission block 401, which may comprise all or part of the second reaction zone. The coating is selected to reduce or eliminate adsorption of the excited species in the emission block. The coatings useful for reduction/elimination of adsorption of the excited species in the emission block are described more fully above.

As noted above, the first reaction zone 404 provides an intermediate reaction product, which is then provided to the second reaction zone 406 to produce the excited species in the emission block 401. The present teachings contemplate detection of a variety of excited species. Illustratively, examples of the detection of sulfur and nitrogen-containing compounds are provided presently. It is emphasized that the present teachings contemplate the detection of excited species of other elements and compounds and other reactions to realize the excited species of sulfur and nitrogen.

In a first example, sulfur containing compounds (e.g., sulfur containing organic compounds) received from the sample stream 412 are burned in the first reaction zone 404 in a hydrogen-rich atmosphere, and form intermediate reaction products SO, $CO_2$ and $H_2O$ (and others). The intermediate reaction products are provided to the transfer zone 405 and then to the second reaction zone 406. In the second reaction zone 406, the SO is oxidized in an ozone ($O_3$) atmosphere to form $SO_2^*$, the excited species. The excited species relaxes to a lower energy state ($SO_2$) and emits a photon (hv), which is detected by the photodetector 403. As such, in the present illustration, the coating provided in the second reaction zone 406 and the interior surface of the emission block 401 usefully reduces or eliminates adsorption of $SO_2^*$.

In a second example, nitrogen containing compounds (e.g., nitrogen containing organic compounds) received from the sample stream 412 are burned in the first reaction zone in an oxygen-rich atmosphere and in the presence of platinum (Pt) catalyst. The intermediate reaction product NO is provided to the transfer zone 405 and then to the second reaction zone 406. In the second reaction zone 406, the intermediate reaction product, NO, is oxidized in an ozone ($O_3$) atmosphere to form $NO_2^*$, the excited species. The excited species relaxes to a lower energy state ($NO_2$) and emits a photon (hv), which is detected by the photodetector 403. As such, in the present illustration, the coating provided in the second reaction zone 406 and the interior surface of the emission block 401 usefully reduces or eliminates adsorption of $NO_2^*$.

In view of this disclosure it is noted that the methods and devices can be implemented in keeping with the present teachings. Further, the various components, materials, structures and parameters are included by way of illustration and example only and not in any limiting sense. In view of this disclosure, the present teachings can be implemented in other applications and components, materials, structures and equipment needed to implement these applications can be determined, while remaining within the scope of the appended claims.

The invention claimed is:

1. An apparatus for receiving a chemical species, further the apparatus comprising:
   an emission block configured to receive a vapor phase chemical species that is excited by chemical reaction in the emission block to provide an excited species that emits light, the emission block having an interior surface; and
   a coating disposed substantially entirely over the interior surface of the emission block, wherein the coating reduces adsorption of the excited species onto the surface;
   a transfer line comprising a first end and a second end opposing the first end, wherein the vapor phase is received at the emission block from the second end;
   a block heater disposed around a first portion of the transfer line, the block heater comprising a heater configured to maintain the first portion of the transfer line at a first temperature range; and
   a body tube substantially surrounding a second portion of the transfer line, the body tube mechanically and thermally coupled to the emission block, wherein the emission block and the body tube are maintained at a second temperature range that is lower than the first temperature range, and the second portion of the transfer line is maintained at the first temperature range.

2. An apparatus as claimed in claim 1, wherein the body tube is brazed to the transfer line and to the emission block.

3. An apparatus as claimed in claim 1, wherein the heater is a first heater and the emission block comprises a second heater configured to maintain the emission block at the second temperature range.

4. An apparatus as claimed in claim 3, further comprising a controller configured to maintain the second heater so that the emission block is maintained at the second temperature range.

5. An apparatus as claimed in claim 1, further comprising a jet housing disposed around the second portion of the transfer line, wherein the jet housing is brazed to the transfer line.

6. An apparatus as claimed in claim 5, wherein the body tube is brazed to the emission block at a first end of the body tube, and the body tube is brazed to the jet housing at a second end of the body tube.

7. An apparatus as claimed in claim 1, wherein the apparatus is a flame photometric detector.

8. An apparatus as claimed in claim 1, wherein the apparatus is a chemiluminescence detector.

9. An apparatus as claimed in claim 1, wherein the excited species comprises sulfur.

10. An apparatus as claimed in claim 1, wherein the excited species comprises nitrogen.

11. An apparatus as claimed in claim 1, wherein the excited species comprises phosphorus.

12. An apparatus as claimed in claim 1, wherein the coating comprises silicon.

13. An apparatus as claimed in claim 12, wherein the coating further comprises chemically modified silicon.

14. An apparatus as claimed in claim 13, wherein the chemically modified silicon comprises an organic material.

15. An apparatus as claimed in claim 1, wherein the coating comprises hydrogenated amorphous silicon.

16. An apparatus as claimed in claim 15, wherein the hydrogenated amorphous silicon is modified with an organic material.

17. An apparatus as claimed in claim 1, wherein the coating comprises a fluoropolymer.

18. An apparatus as claimed in claim 1, wherein the vapor phase species is received from a gas chromatograph (GC).

19. An apparatus as claimed in claim 1, further comprising a transfer line comprising a first end and a second end opposing the first end, wherein the vapor phase is received at the emission block from the second end.

* * * * *